(12) United States Patent
Fujita et al.

(10) Patent No.: US 7,907,889 B2
(45) Date of Patent: Mar. 15, 2011

(54) DIGITAL BROADCASTING RECEIVER

(75) Inventors: Yuka Fujita, Tokyo (JP); Koichi Hiramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 541 days.

(21) Appl. No.: 11/991,247

(22) PCT Filed: Nov. 2, 2005

(86) PCT No.: PCT/JP2005/020226
§ 371 (c)(1),
(2), (4) Date: Feb. 29, 2008

(87) PCT Pub. No.: WO2007/052350
PCT Pub. Date: May 10, 2007

(65) Prior Publication Data
US 2009/0282456 A1    Nov. 12, 2009

(51) Int. Cl.
*H04H 20/74*    (2008.01)
(52) U.S. Cl. ...... 455/3.02; 455/3.01; 348/731; 725/100; 725/131
(58) Field of Classification Search ............... 455/3.01, 455/3.02; 348/731, 725, 726, 553; 725/38, 725/119, 115, 100, 131
See application file for complete search history.

(56) References Cited

U.S. PATENT DOCUMENTS

| | | | |
|---|---|---|---|
| 7,716,713 B1 * | 5/2010 | Ryu et al. ............... | 725/132 |
| 2001/0028782 A1 | 10/2001 | Ohno et al. | |
| 2002/0154699 A1 | 10/2002 | Yamaguchi et al. | |
| 2003/0070172 A1 | 4/2003 | Matsuzaki et al. | |
| 2003/0081671 A1 | 5/2003 | Ishida et al. | |
| 2003/0179835 A1 * | 9/2003 | Tsubouchi et al. ........... | 375/316 |
| 2004/0181800 A1 * | 9/2004 | Rakib et al. ............... | 725/25 |
| 2005/0033793 A1 * | 2/2005 | Monta et al. ............... | 709/200 |
| 2005/0071661 A1 * | 3/2005 | Yamada ....................... | 713/193 |
| 2005/0122430 A1 * | 6/2005 | Lee et al. .................... | 348/559 |
| 2005/0160453 A1 * | 7/2005 | Kim ............................ | 725/39 |
| 2005/0193418 A1 * | 9/2005 | Miyabayashi ............... | 725/68 |
| 2005/0286563 A1 * | 12/2005 | Hong .......................... | 370/488 |
| 2006/0010473 A1 * | 1/2006 | Takagi et al. ............... | 725/72 |
| 2006/0020988 A1 * | 1/2006 | Takagi et al. ............... | 725/100 |
| 2006/0024026 A1 * | 2/2006 | Yamashita et al. .......... | 386/83 |
| 2006/0045465 A1 * | 3/2006 | Ono et al. ................... | 386/46 |

FOREIGN PATENT DOCUMENTS

| | | |
|---|---|---|
| JP | 11-215203 A | 8/1999 |
| JP | 2001-275049 A | 10/2001 |
| JP | 2001-285729 A | 10/2001 |
| JP | 2002-158726 A | 5/2002 |
| JP | 2002-218427 A | 8/2002 |
| JP | 2003-134064 A | 5/2003 |
| JP | 2003-169329 A | 6/2003 |
| JP | 2003-235041 A | 8/2003 |
| JP | 2003-298541 A | 10/2003 |
| JP | 2004-320394 A | 11/2004 |
| JP | 2005-101860 A | 4/2005 |
| JP | 2005-348084 A | 12/2005 |

* cited by examiner

*Primary Examiner* — Dominic E Rego
(74) *Attorney, Agent, or Firm* — Birch, Stewart, Kolasch & Birch, LLP

(57) ABSTRACT

A digital broadcasting receiver temporarily stores data about a digital broadcasting program currently being viewed and listened-to at a time when the reception state thereof is good in the form of transport packets or packets of a data broadcasting content, or in the form of a screen still image, and, when the reception state has gotten worse, plays back the stored data as an alternative image.

19 Claims, 8 Drawing Sheets

FIG. 1
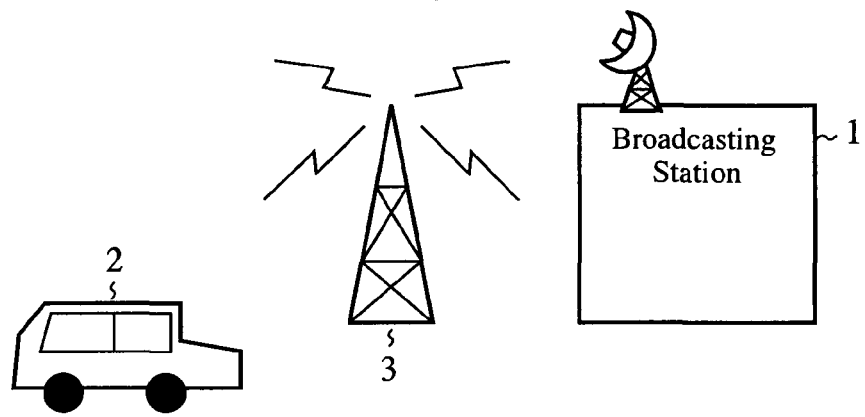
FIG. 3
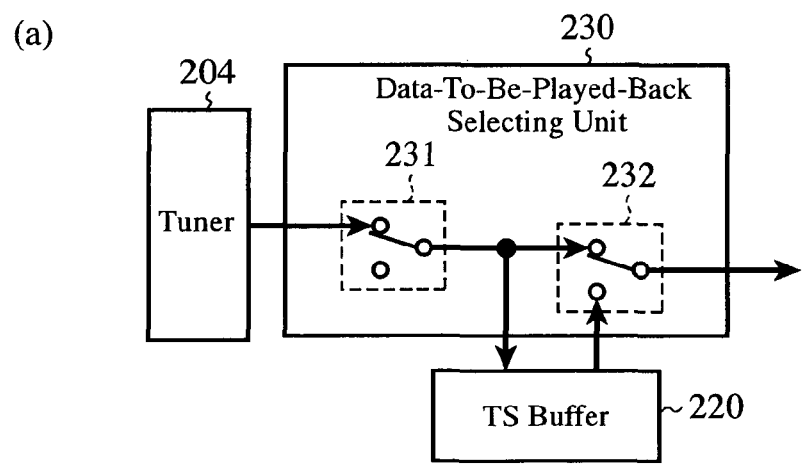
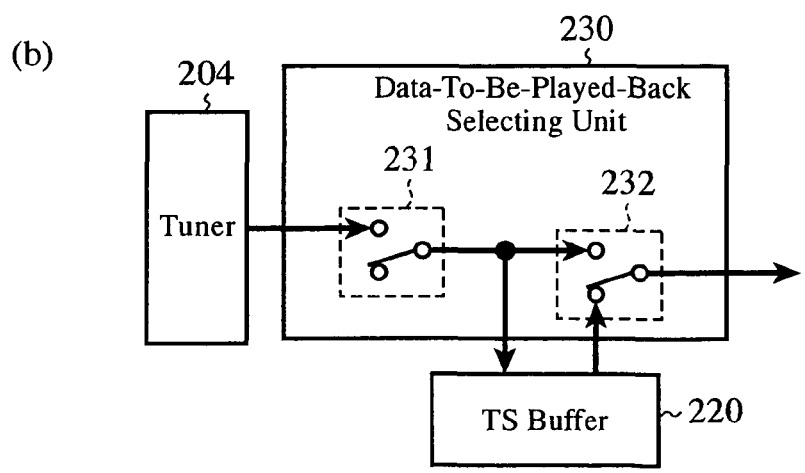

DIGITAL BROADCASTING RECEIVER

FIELD OF THE INVENTION

The present invention relates to a digital broadcasting receiver which plays back, as an alternative image, data which were stored therein in advance when its reception state was good at a time when the reception state has gotten worse.

BACKGROUND OF THE INVENTION

Digital broadcasting has a characteristic that radio disturbance does not easily occur as compared with analog broadcasting. There are several reasons for this. First, in order to make digital broadcasting highly resistant to multipath disturbance, guard intervals are lengthened sufficiently. Second, in order to improve the stability of signals, a double error correction method using an RS code and a convolutional code is used. Third, errors of data are made to be distributed with interleaving in such a manner that an error correction can be effectively made to the errors. Fourth, in order to reduce the reflectivity of electric waves and the energy of pulse noise, a UHF band is used. Thus, in digital broadcasting, although many measures are taken against radio disturbance, in a case of a digital broadcasting receiver mounted in mobile equipment, radio disturbance easily occurs depending on receiving environments as compared with a case of a non-portable digital broadcasting receiver. This radio disturbance causes a block noise which appears on the screen in a case of an image, and causes a sound skip in a case of a sound.

As a measure against such radio disturbance, a method of, in a vehicle-mounted broadcasting receiver, storing the broadcasting signal in a storage medium before the reception has broken off, playing back the broadcast data stored therein when the vehicle enters a region in which no electric wave does not reach, such as a tunnel, and preventing noise from occurring when the reception breaks off is disclosed in patent reference 1. Furthermore, a method of a broadcasting station coding one broadcast program into two types of data: data having a high bit rate and data having a low bit rate, and delivers them through broadcasting or via a communication network, and a receiver playing back a fine image associated with the data having the high bit rate while the reception state is good and playing back an image associated with the data having the low bit rate when the reception state has gotten worse is disclosed by patent reference 2. This reference also shows a technology of using, as a deterioration index of the radio wave state, the radio field intensity or the header information in the broadcast data to solve problems of redundancy of data to be played back and of switching timing. In addition, a method of multiplexing two sets of identical data by shifting them with respect to time, and then broadcasting them, and a receiver playing back the data which are sent thereto later while the reception state is good, and playing back the other data which are sent thereto previously and are held therein when the reception state has gotten worse is disclosed by patent reference 3.

[Patent reference 1] JP, 2001-275049, A (see pp. 2 to 3 and FIGS. 1 and 3)
[Patent reference 2] JP, 2003-134064, A (see pp. 12 and FIGS. 1 and 3)
[Patent reference 3] JP, 2004-320394, A (see pp. 12 and FIGS. 1 and 2)

In the case of the broadcasting receiver described in patent reference 1, a broadcasting signal which is stored in a storage medium and which was received before the reception has broken off is used. However, patent reference 1 does not concretely disclose any information about the data configuration of actual digital broadcasting. A problem is therefore that, for example, because it is not taken into consideration about the storage format of stored data, there is a high possibility that when switching to a playback of stored data at a time when the reception state has gotten worse suddenly, the image and/or the sound break off. Furthermore, in the case of the method disclosed in patent reference 1 or patent reference 2, two data of different formats are generated for an identical broadcast program, and they are transmitted via multiplex broadcasting after a time lag is introduced between them or they are transmitted via different communication networks or the like, respectively, and therefore this method has a problem with infrastructure improvement that the method cannot be implemented unless the broadcasting station side supports this method, and also has a problem that the implementation of the method cannot be carried out only by the receiver.

The present invention is made to solve the above-mentioned problems, and relates to a digital broadcasting receiver which can complete the implementation of a measure against radio disturbance to transmission radio waves of currently available digital broadcasting only by the receiver itself, and which, when switching to stored data during playback of broadcast data, can perform a smooth playback of the stored data by using a devised storage format.

DISCLOSURE OF THE INVENTION

A digital broadcasting receiver in accordance with the present invention includes a tuner for tuning in to a specified channel from a broadcasting wave received so as to extract a transport stream, and for generating reception state information indicating a reception state depending on a radio field intensity of the broadcasting wave; a reception state determining means for determining the reception state on a basis of the reception state information; a transport stream storing means for temporarily storing a fixed amount of transport stream; a data-to-be-played-back selecting means for, when the reception state determining means determines that the reception state is good, outputting the transport stream extracted by the tuner to a backward stage, just as it is, to set the transport stream as data to be played back, and storing this transport stream in the transport stream storing means, and for, when the reception state determining means determines that the reception state has gotten worse, blocking out an output of the tuner, and reading transport streams stored from the transport stream storing means in order that they were stored and outputting them to a backward stage as data to be played back; and a demultiplexer for demultiplexing a transport stream outputted from the data-to-be-played-back selecting means into packet data about multiple media, delivering these data to a corresponding playback means provided for each of the multiple media, and, when the reception state determined by the reception state determining means changes, handling this change as a discontinuous point of the transport stream.

Therefore, because when the reception state has gotten worse, the digital broadcasting receiver plays back and displays, as alternative data, the program data which have been stored immediately before the reception state has gotten worse, instead of the received data, the digital broadcasting receiver can complete the implementation of a measure against radio disturbance only by the receiver itself, and therefore the broadcasting station side simply needs to broadcast only one source of a real-time broadcasting wave. Furthermore, because the digital broadcasting receiver uses a devised storage format, when switching to stored data during playback of broadcast data, the digital broadcasting receiver can perform a smooth playback of the stored data. In addition, because the digital broadcasting receiver in accordance with the present invention is so constructed as to store alternative data on the basis of the program data currently being broadcast by itself, even in a case in which the broadcast program scheduling is changed suddenly due to a live outside broadcast, an emergency broadcast, or the like, the digital broadcasting receiver can respond to the change.

BRIEF DESCRIPTION OF THE FIGURES

FIG. 1 is an explanatory drawing showing an outline structure of a digital broadcasting system to which a digital broadcasting receiver of the present invention is applied;

FIG. 3 is an explanatory drawing showing an operating state of a data-to-be-played-back selecting unit in accordance with Embodiment 1 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

FIG. 1 is an explanatory drawing showing an outline structure of a digital broadcasting system to which a digital broadcasting receiver in accordance with the present invention is applied.

In FIG. 1, after a broadcasting station 1 codes each of various data such as an image, a sound, and a data broadcasting content which construct a broadcast program, the broadcasting station 1 carries out media-multiplexing of the coded data to generate a transport stream (Transport Stream: referred to as TS from here on) which is defined by ISO/IEC 13818-1, and outputs the transport stream using a broadcast electric wave. The broadcast electric wave outputted from the broadcasting station 1 is relayed by a relay antenna 3, and is then received by the digital broadcasting receiver mounted in a vehicle 2.

Figure 2:
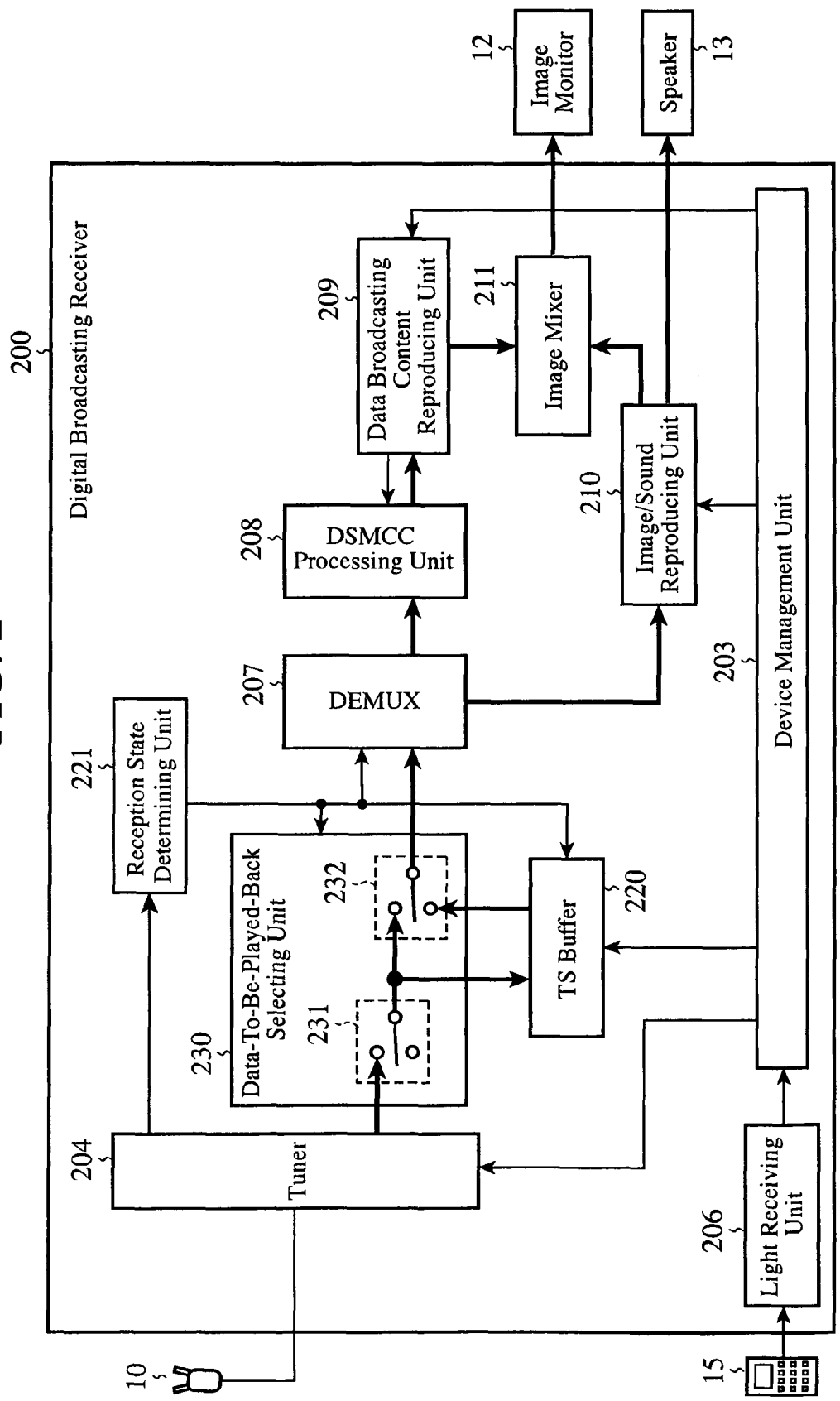
FIG. 2 is a block diagram showing the functional constitution of a digital broadcasting receiver in accordance with Embodiment 1 of the present invention.

FIG. 2 is a block diagram showing the functional constitution of the digital broadcasting receiver in accordance with Embodiment 1 of the present invention.

The digital broadcasting receiver 200 is mounted in the vehicle 2, and a vehicle-mounted digital broadcasting antenna 10 which receives the broadcast electric wave, a remote control 15, an image monitor 12, and a speaker 13 are connected to the digital broadcasting receiver. In the structure of the digital broadcasting receiver 200, a device management unit 203 is a means for managing various processes carried out by the receiver.

A tuner 204 is a means for tuning in to a specified channel to extract a required TS from the broadcast wave which is received by the vehicle-mounted antenna 10. A light receiving unit 206 is a means for receiving an infrared signal emitted from the remote control 205 so as to notify the details of an instruction caused by a user's operation to the device management unit 203.

A demultiplexer (de-multiplexer: referred to as a DEMUX from here on) 207 is a means for demultiplexing packet data about multiple media, such as an image, a sound, and a data broadcasting content, which are multiplexed into the digital broadcast wave, into packet data of the different types. A DSMCC processing unit (a data broadcasting content transmission packet processing means) 208 is a means for reconstructing data according to a DSMCC (Digital Storage Media Command and Control: DSMCC will be mentioned later in Embodiment 3) protocol from the packet data about the data broadcasting content which are demultiplexed by the DEMUX 207 so as to generate file data about the data broadcasting content. A data broadcasting content reproducing unit 209 is a means for reproducing an image signal of the data broadcasting content from the file data about the data broadcasting content. An image/sound reproducing unit 210 is a means for reproducing an image signal and a sound signal from the coded data about the image and the sound demultiplexed by the DEMUX 207. An image mixer 211 is a means for compositing the image signal outputted from the data broadcasting content reproducing unit 209 and the image signal outputted from the image/sound reproducing unit 210.

A TS buffer (a transport stream storing means) 220 is a means for temporarily storing a fixed amount of TS outputted from the tuner 204. A reception state determining unit 221 is a means for determining the reception state of the receiver on the basis of information showing the reception state acquired from the tuner 204. A data-to-be-played-back selecting unit 230 is a means for selecting, as data to be played back, either a TS from the tuner 204 or a TS from the TS buffer 220 on the basis of the determination result of the reception state determining unit 221. To this end, the data-to-be-played-back selecting unit 230 is provided with a tuner input selection switch 231 for selecting a TS inputted from the tuner 204, and a TS-to-be-played-back selecting switch 232 for selecting, as the source of a TS to be played back, either the tuner 204 or the TS buffer 220.

Next, the operation of the digital broadcasting receiver will be explained.

When a user instructs to view and listen to a broadcast program using the remote control 15, the details of the instruction are notified to the device management unit 203 by way of the light receiving unit 206. The device management unit 203 analyzes the details of the instruction to notify the channel specified by the user to the tuner 204, and also notifies a playback start to the image/sound reproducing unit 210. The tuner 204 tunes in to the specified channel to extract a TS from the broadcast wave which is received by the vehicle-mounted digital broadcasting antenna 10. In the case of the present invention, the tuner 204 also generates reception state information indicating the reception state of the digital broadcasting receiver depending on the radio field intensity of the received broadcast wave, and inputs this reception state information to the reception state determining unit 221. The reception state determining unit 221 determines the reception state on the basis of this reception state information, and notifies the determination result of the reception state to the data-to-be-played-back selecting unit 230, the TS buffer 220, and the DEMUX 207.

Assuming that the reception state is good, on the basis of the determination result, the data-to-be-played-back selecting unit 230 sets the tuner input selection switch 231 and the TS-to-be-played-back selecting switch 232 in such a manner that the output TS from the tuner 204 is inputted to both the DEMUX 207 and the TS buffer 220, as shown in FIG. 3(a). As a result, the TS from the tuner 204 is inputted to the DEMUX 207 via the data-to-be-played-back selecting unit 230. The DEMUX 207 demultiplexes the inputted TS into the coded image data, the coded sound data, and the DSMCC packets of the data broadcasting content, and inputs the coded image data and the coded sound data to the image/sound reproducing unit 210 and also inputs the DSMCC packets to the DSMCC processing unit 208. The image/sound reproducing unit 210 which is notified of the playback start by the device management unit 203 decodes each of the inputted image and sound coded data, and outputs an image signal to the image mixer 211. On the other hand, the packet data about the data broadcasting content demultiplexed by the DEMUX 207 are reconstructed by the DSMCC processing unit 208 according to the DSMCC protocol, so that file data about the data broadcasting content are generated. The data broadcasting content reproducing unit 209 reproduces an image signal from these file data about the data broadcasting content, and outputs the image signal to the image mixer 211.

The image mixer 211 composites the image signal from the image/sound reproducing unit 210 and the image signal from the image mixer 211, and outputs a composite image signal to the image monitor 12. A sound signal from the image/sound reproducing unit 210 is outputted to the speaker 13.

While the reception state is good, the data-to-be-played-back selecting unit 230 inputs the output TS from the tuner 204 to the TS buffer 220. As a result, a predetermined amount of TS which is received while the reception state is good is temporarily stored in the TS buffer 220.

Next, when the reception state of the broadcast electric wave changes from the good state to a getting-worse state in the digital broadcasting receiver 200, on the basis of the determination result of the reception state determining unit 221, the data-to-be-played-back selecting unit 230 sets the tuner input selection switch 231 and the TS-to-be-played-back selecting switch 232 in such a manner that, as shown in FIG. 3(b), the output of the tuner 204 is not inputted to the DEMUX 207 and the TS buffer 220, instead only the TS stored in the TS buffer 220 is inputted to the DEMUX 207. The DEMUX 207 also handles, as a discontinuous point of the stream, the time of reception of the notification of the determination result showing that the reception state has been changed from the reception state determining unit 22. The DEMUX 207 then demultiplexes the TS read from the TS buffer 220 into the image coded data, the sound coded data, and the DSMCC packets of the data broadcasting content. After that, the digital broadcasting receiver carries out the same processing as that mentioned above to play back an alternative image and an alternative sound by using the image monitor 12 and the speaker 13.

The TS buffer 220 receives a buffer reset signal from the device management unit 203 when a user starts viewing and listening to a program or when is notified that the reception state has changed from the getting-worse state to the good state from the reception state determining unit 221, and the contents of the TS buffer are then cleared. After that, the latest data provided by the data-to-be-played-back selecting unit 230 are written into the buffer which temporarily uses the program in the form of a ring within an upper limit of a certain amount. In contrast, while the reception state gets worse, data are read repeatedly from the TS buffer in the form of a ring in order that they were stored in the buffer and are then outputted.

As mentioned above, because the digital broadcasting receiver in accordance with this Embodiment 1 temporarily stores program data being viewed and listened-to in the form of TS, and, when the reception state has gotten worse, plays back the stored data, the same broadcast program needs not to be doubly prepared in advance by the broadcasting station side, and the digital broadcasting receiver can therefore continue its playback operation on the basis of one resource. Therefore, because the receive side can store alternative data based on program data currently being broadcast with this structure, there is provided an advantage of being able to, even in a case in which the broadcast program scheduling is changed suddenly due to a live outside broadcast, an emergency broadcast, or the like, enable the receiver to respond to the change independently of the broadcasting station.

In the structure of above-mentioned FIG. 2, when notified that the broadcast program has been ended via the channel via which the user has been viewing and listening to the broadcast program from program scheduling information, such as program arrangement information, which is included in the broadcast wave, about arrangement of programs currently being broadcast and programs to be broadcast, such as when the PID (Packet ID) of the program currently being viewed and listened-to disappears from a PMT (Program Map Table) defined by ISO/IEC 13818-1, the digital broadcasting receiver can discard all data stored in the TS buffer 220 temporarily, and can newly store data about a broadcast program which a user schedules to view and listen to for the next time. In this case, the PMT is a piece of program arrangement information which is transmitted with being included in the payload of the TS, and is a table which stores the PIDs of the image, the sound, etc. included in the service. By collecting packets each having a PID which is acquired from the PMT (channel selection), it is used in order to play back the program.

For example, even in a case in which the digital broadcasting receiver is notified that the broadcast program currently being viewed and listened-to is already ended from the program scheduling information, such as the above-mentioned PMT, and a EIT (Event Information Table: a table including information about programs, such as program names, program start dates, program lengths, and broadcast contents) which is defined by ARIB STD-B10, when the reception state is getting worse and the digital broadcasting receiver cannot play back any new program data currently being broadcast, the DEMUX 207 can continue playing back the program data which are stored in the TS buffer 220 and which have not been ended yet. In this case, information showing that the broadcast program has been already ended can be provided on the screen.

Furthermore, when an expiration date for viewing and listening-to of the program is specified by RMPI (Right Management & Protection Information), an expire description defined by ARIB STD-B10, or the like which is included in the TS, the DEMUX 207 can control of utilization of data from the TS buffer 220 according to the expiration date information. As an alternative, the DEMUX can provide information indicating that the expiration date has been reached and continue playing back the program.

In the explanation of Embodiment 1, the case in which immediately after receiving a TS, the digital broadcasting receiver plays back it is shown. As an alternative, the digital broadcasting receiver uses a method of delaying the playback by a time interval required to determine whether the reception state has changed using the TS buffer 220 as mentioned above. In this case, the digital broadcasting receiver is not equipped with the above-mentioned playback selecting switch 232, performs the process of writing data in the TS buffer 220 while the reception state is good, whereas the digital broadcasting receiver stops the writing process while the reception state gets worse, and has only to always carry out an operation of reading the data from the TS buffer 220 and an operation of playing back the data using the data which are stored in the TS buffer 220 regardless of the reception state.

Furthermore, in Embodiment 1, the reception state is acquired by the tuner 204 on the basis of the radio field intensity. As an alternative, the DEMUX 207 can acquire the reception state on the basis of sequential number information, time information, or the like which is included in the packet header or the like of the TS.

Embodiment 2

Figure 4:
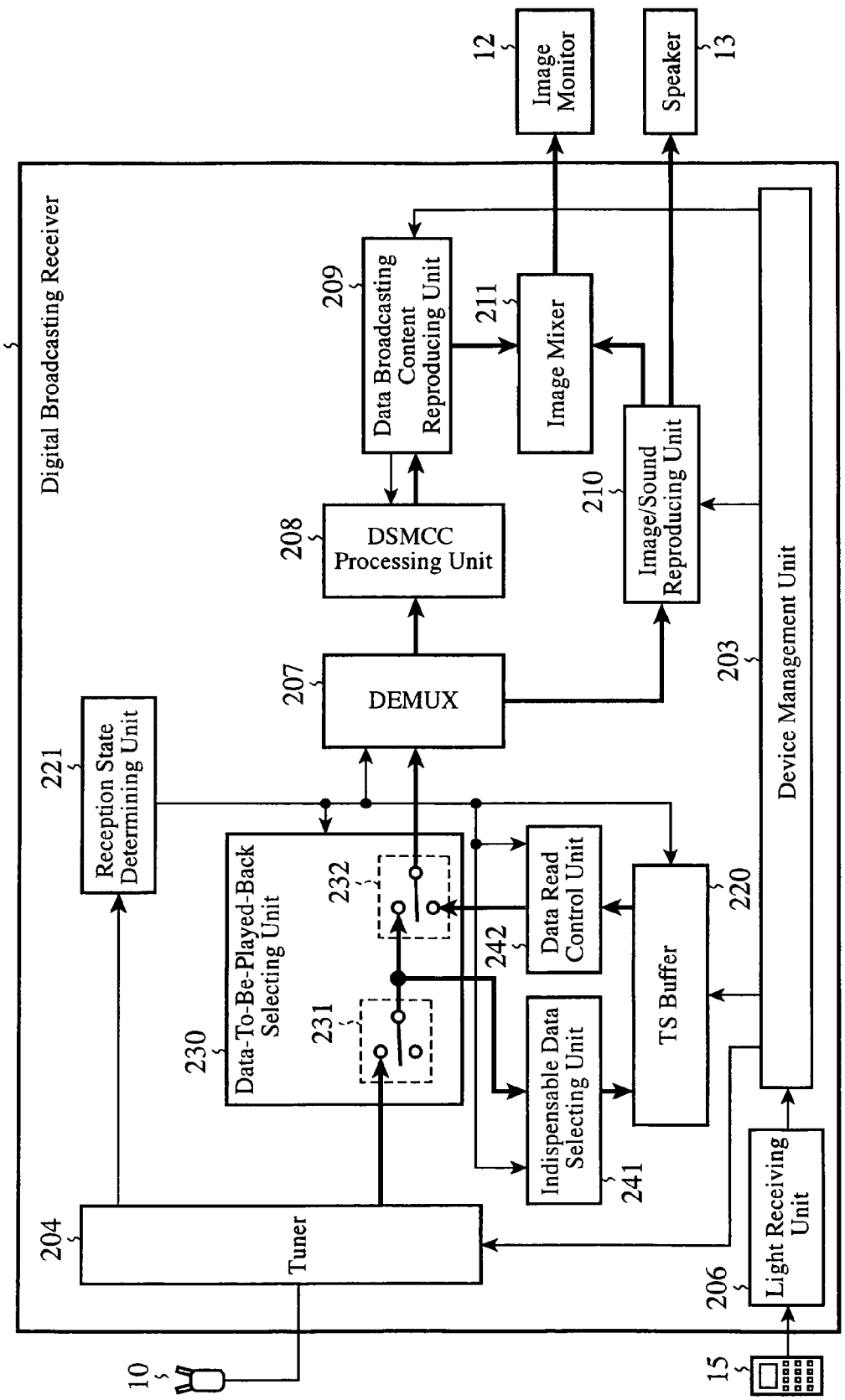
FIG. 4 is a block diagram showing the functional constitution of a digital broadcasting receiver in accordance with Embodiment 2 of the present invention.

FIG. 4 is a block diagram showing the functional constitution of a digital broadcasting receiver in accordance with Embodiment 2 of the present invention. In the figure, the same components as those shown in FIG. 2 are designated by the same reference numerals, and the explanation of the components will be omitted hereafter in principle.

An indispensable data selecting unit (an indispensable data selecting means) 241 is a means for deleting null packets which are meaningless packets inserted at the broadcasting station in order to hold the transmission timing from a TS provided thereto via the data-to-be-played-back selecting unit 230, for generating playback timing information which provides a timing required at a time of playback of the TS and inserting the playback timing information, instead of the deleted null packets, into the TS to generate a significant TS, and for storing this significant TS in the TS buffer 220. A data read control unit (a data read control means) 242 is a means for reading the significant TS stored in the TS buffer 220 while the reception state of the digital broadcasting receiver gets worse, and inserting a number of null packets which provide the playback timing on the basis of the playback timing information inserted into the significant TS, to generate a transport stream having the original length, and to output the transport stream to the DEMUX 207 via the data-to-be-played-back selecting unit 230.

Next, the operation of the digital broadcasting receiver will be explained.

Like that of above-mentioned Embodiment 1, while the reception state is good, the data-to-be-played-back selecting unit 230 is set as shown in FIG. 3(*a*). A TS extracted by the tuner 204 is inputted to both the indispensable data selecting unit 241 and the DEMUX 207. At this time, the indispensable data selecting unit 241 deletes null packets from the TS inputted thereto, and also generates playback timing information, inserts this playback timing information into the TS, instead of the deleted null packets, generates a significant TS, and stores this significant TS in the TS buffer 220 temporarily.

In contrast, while the reception state gets worse, the data-to-be-played-back selecting unit 230 is set as shown in FIG. 3(*b*) and the output of the tuner 204 is blocked out. The data read control unit 242 reads the significant TS stored in the TS buffer 220, and extracts the playback timing information from the significant TS. The data read control unit then generates null packets on the basis of the playback timing information, inserts them into the significant TS, reproduces the original TS, and outputs this TS to the DEMUX 207. As a result, the reproduced TS is inputted to the DEMUX 207 at an appropriate timing.

Figure 5:
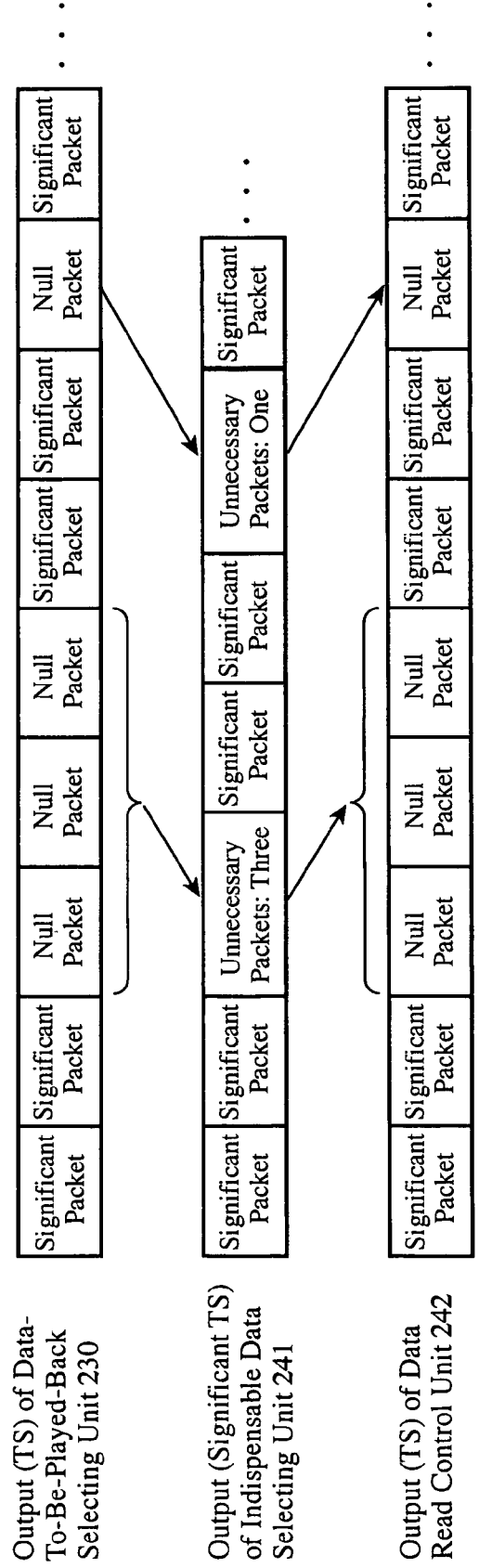
FIG. 5 is an explanatory drawing showing an example of playback timing information in accordance with Embodiment 2 of the present invention.

Hereafter, an example of the playback timing information will be explained with reference to FIG. 5.

The indispensable data selecting unit 241 finds out the null packets from the TS which are outputted from the data-to-be-played-back selecting unit 230, and deletes them by determining them as unnecessary packets. The indispensable data selecting unit then generates playback timing information in which the number of continuous unnecessary packets is described and inserts the playback timing information into a position where the null packets existed to generate a significant TS and, stores this significant TS in the TS buffer 220.

On the other hand, the data read control unit 242 extracts unnecessary packet continuation number information which is incorporated as the playback timing information from the significant TS read from the TS buffer 220 while the reception state gets worse. The data read control unit then inserts a number of null packets whose number is determined according to the information into a corresponding position of the significant TS so as to reproduce the TS having the original length. The TS generated in this way is outputted to the DEMUX 207 at an appropriate timing via the TS-to-be-played-back selecting switch 232 of the data-to-be-played-back selecting unit 230.

As mentioned above, the digital broadcasting receiver in accordance with this Embodiment 2 deletes packets other than significant packets from stream data while the reception state is good, adds playback timing information instead, and stores the stream data in the TS buffer 220. Therefore, because the digital broadcasting receiver can store the stream data after shortening the length of the stream data, the digital broadcasting receiver can use the resource of the TS buffer effectively.

In this embodiment, because a TS is broadcast as a single stream with data about programs of plural channels being multiplexed into the stream, while the reception state is good, a TS into which data about programs of plural channels are multiplexed is inputted to the indispensable data selecting unit 241. Therefore, the device management unit 203 notifies the channel number currently being viewed and listened-to to the indispensable data selecting unit 241, and the indispensable data selecting unit 241 performs the same processing as that mentioned above by assuming that data packets of programs which are not being viewed and listened to and null packets are unnecessary packets. As a result, the output data about channels other than the channel currently being viewed and listened-to, which are outputted from the data read control unit 242, are all null packets, though the output data about the channel currently being viewed and listened-to can be normally reproduced by the functional blocks disposed behind the DEMUX 207.

In the case in which the TS is associated with one program, the TS is constructed of a plurality of mono-media such as an image, a sound, and a data broadcasting content, and each mono-medium is transmitted with a specific PID being added to each mono-medium. The indispensable data selecting unit 241 can restrict to specific mono-media and then construct a significant TS from these specific mono-media by, in a case of, for example, keeping only the image and the sound selectively from the plurality of mono-media, handling packets of the image and sound and packets of information about control of the image and sound as significant packets, and assuming that any other packets are unnecessary packets. In addition, in a case of, for example, MPEG-2 Video (ISO/IEC 13818-2 recommendation) which is a video coding with which data are coded and transmitted in the form of TS, the data are comprised of frame data (intra-frame) which can be decoded only with the frame data, and frame data (inter-frame) which consist of only data about difference with forward and backward frames. When data coded according to this MPEG-2 Video are transmitted in the form of TS, they are divided into parts each having a specific data length and a header is added to each part, and a flag is set by the header of an intra-frame data leading packet (random_access_indicator in adaptation_field( ) is set to one). The digital broadcasting receiver can be so constructed as to implement a more smooth playback by starting storing mono-media coded data in the TS buffer 220 according to such information which enables the mono-media coded data to be decoded most finely.

Furthermore, because the TS buffer 220 is used as a ring buffer, when the amount of data stored in the TS buffer exceeds a fixed amount, the oldest data are overwritten by new data so that the fixed amount of latest data are held by the TS buffer. Therefore, a region from a data position at which mono-media coded data are decoded most finely to a position immediately before a data position at which the next mono-media coded data are decoded most finely can be defined as one unit, and can be used as a unit in which overwriting of old data with new data is performed on the ring buffer.

Embodiment 3

In this Embodiment 3, a method of storing data and playing back the data while the reception state gets worse will be explained by focusing attention on a data broadcasting service.

First, how a data broadcasting content is media-multiplexed with coded data about an image and coded data about a sound, etc. and is then broadcast will be explained briefly. A data broadcasting content is multiplexed as DSMCC packet data. DSMCC (Digital Storage Media Command and Control) is a protocol which conforms to MPEG 2 streams and which enables access to stored audio visual data from a remote location, and is defined by the ISO/IEC 13818-6 recommendation. Particularly, in a distributed environment, such as a video on demand system, a protocol for controlling data access is required, and the standardization of this protocol is the DSMCC protocol. In Japan, on the basis of this protocol, the standard STD-B24 for data broadcasting coding methods and transmission methods for use in digital broadcasting is defined by Association of Radio Industries and Businesses (abbreviated as ARIB).

Figure 6:
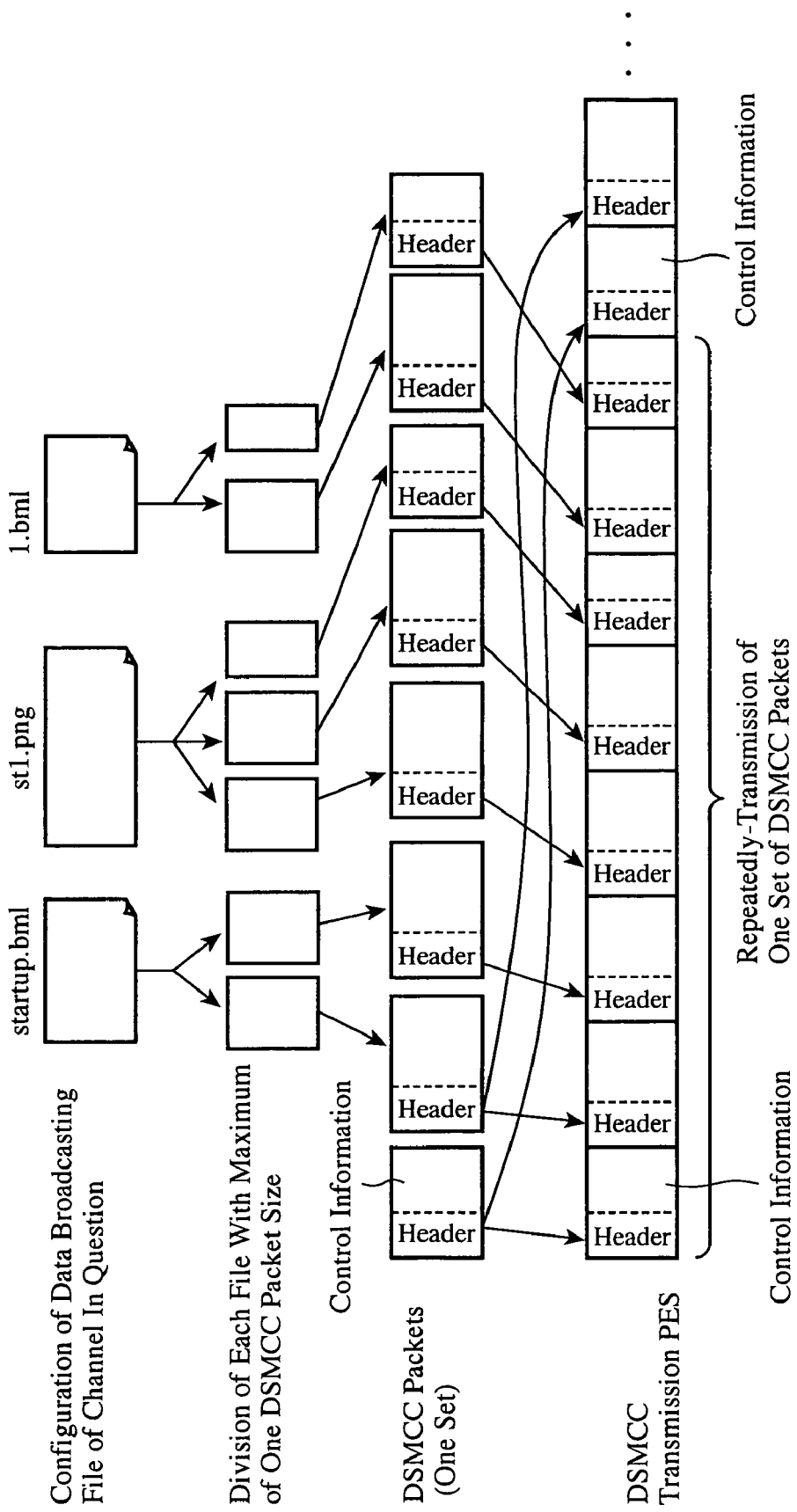
FIG. 6 is an explanatory drawing showing the configuration of transmission data about a data broadcasting content.

Furthermore, in accordance with STD-B24, while DSMCC transmission of a multimedia content mainly including a file written in a markup language called BML (Broadcast Markup Language) is carried out as one data broadcasting, it is defined, in this BML content, that a start page must have a file name of "startup.bml." For example, as shown in FIG. 6, a data broadcasting content which is broadcast by a broadcasting station is comprised of the following three files: "startup.bml", "st1.png", and "1.bml." In a case in which the "st1.png" file is referred to in the "startup.bml" file and a link to the "1.bml" file is provided in the "startup.bml" file, control information indicating this data broadcasting file configuration information and so on is generated and a DSMCC header is added to each file data and the control information, and DSMCC packets are generated. A set of these DSMCC packets is sent out repeatedly (carousel sending out) and a PES (Packetized Elementary Stream) is constructed. The PES is further divided into TS packets each of which is a finer information unit (having a fixed length of 188 bytes), and they are arranged in predetermined order and are multiplexed with TS packets of coded data bout an image and a sound in a broadcast band, so that a TS which is one sequence of bits is generated. On the other hand, the receiver generally uses a method of acquiring the files of the newest data broadcasting content and playing back the files according to an instruction from a user in order to reduce the amount of memories mounted therein.

Figure 7:
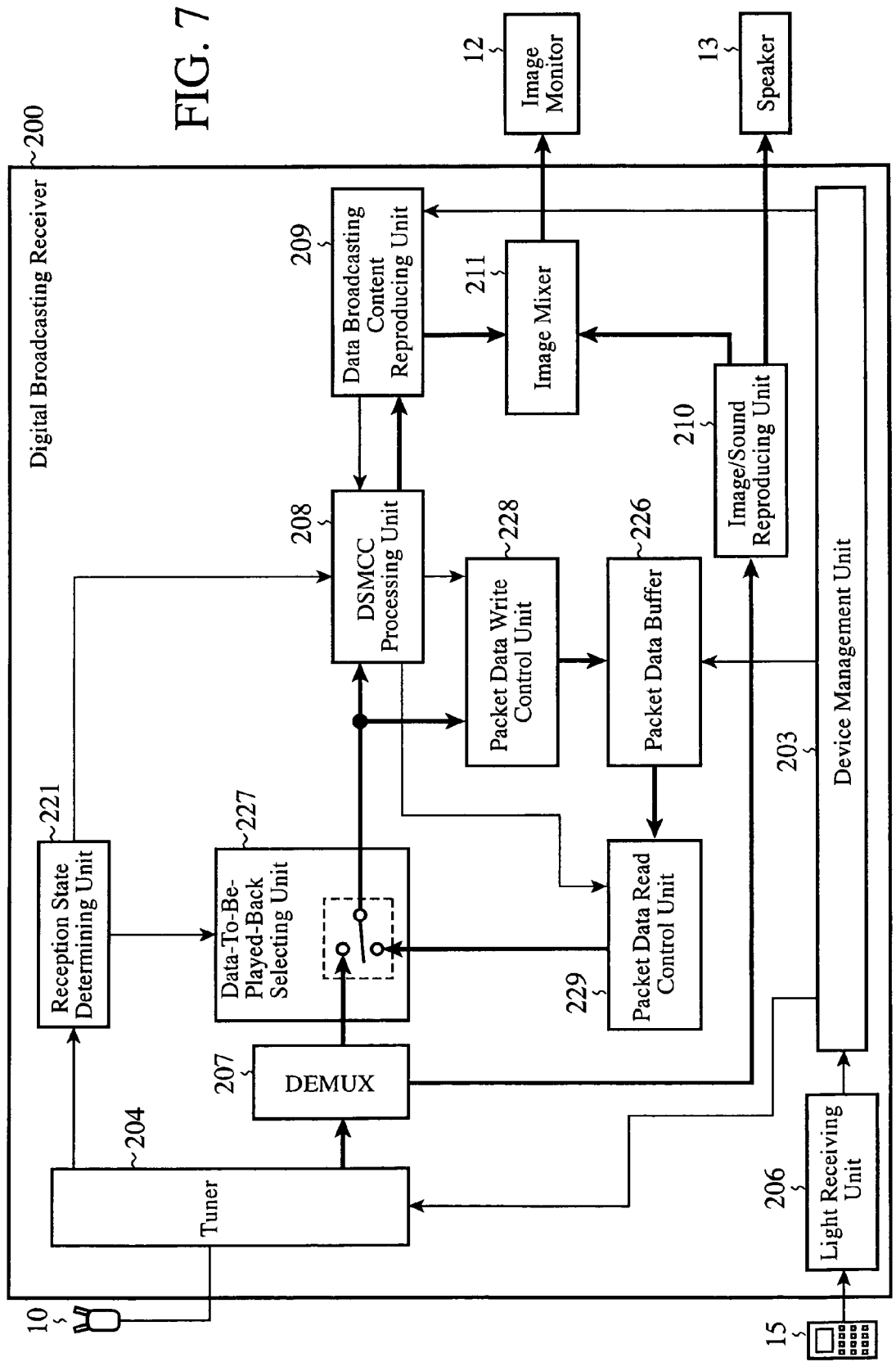
FIG. 7 is a block diagram showing the functional constitution of a digital broadcasting receiver in accordance with Embodiment 3 of the present invention.

FIG. 7 is a block diagram showing the functional constitution of the digital broadcasting receiver in accordance with Embodiment 3 of the present invention. In the figure, the same components as those shown in FIG. 2 are designated by the same reference numerals, and the explanation of the components will be omitted hereafter.

A packet data buffer (a packet data storing means) 226 is a means for temporarily storing a fixed amount of DSMCC data (packet data about data broadcasting) at a time when the reception state is good. A data-to-be-played-back selecting unit 227 is a means for setting a built-in switch on the basis of the determination result of the reception state determining unit 221, and for, when it is determined that the reception state is good, outputting DSMCC data demultiplexed by the DEMUX 207 to the DSMCC processing unit 208, whereas when it is determined that the reception state has gotten worse, outputting packet data which the packet data readout control 229 reads from the packet data buffer 226 to both the DSMCC processing unit 208 and a packet data write control unit 228. The packet data write control unit 228 is a means for selecting DSMCC data for a data broadcasting content associated with a program currently being viewed and listened-to from the output of the data-to-be-played-back selecting unit 227, and for storing data which are not stored in the packet data buffer 226 therein. A packet data read control unit 229 is a means for outputting required DSMCC data from the packet data buffer 226 according to a read instruction from the DSMCC processing unit 208.

Next, the operation of the digital broadcasting receiver will be explained.

An electric wave of a TS into which image coded data, sound coded data, and DSMCC packets are multiplexed from a broadcasting station 1 as shown in FIG. 1 is received by the vehicle-mounted digital broadcasting antenna 10, as in the case of Embodiment 1 and Embodiment 2. When a user instructs to view and listen to a broadcast program using the remote control 15, the device management unit 203 analyzes the details of the instruction to provide notification of start of a playback of a data broadcasting service containing a program number tied to the program which the user desires to view and listen to the data broadcasting content reproducing unit 209. The data broadcasting content reproducing unit 209 analyzes the description of the playback start notification, and issues an acquisition instruction of acquiring the "startup.bml" file to which the program number included in the notification of start of a playback of the data broadcasting service to the DSMCC processing unit 208. On the other hand, when the TS extracted by the tuner 204 is inputted to the DEMUX 207, the DEMUX 207 demultiplexes the inputted TS into the image coded data, the sound coded data, and the DSMCC packets of the data broadcasting content, and outputs the image coded data and the sound coded data to the image/sound reproducing unit 210 and also outputs the DSMCC packets to the data-to-be-played-back selecting unit 227. The image/sound reproducing unit 210 decodes the image coded data and the sound coded data to output an image signal to the image monitor 12 by way of the image mixer 211 and also output a sound signal to the speaker 13, so that they are played back, like that of Embodiment 1.

At this time, when the reception state is good, the data-to-be-played-back selecting unit 227 sets a built-in switch on the basis of the determination result of the reception state determining unit 221 in such a manner that the DSMCC packets outputted from the DEMUX 207 are inputted to both the DSMCC processing unit 208 and the packet data write control unit 228. The DSMCC processing unit 208 monitors only DSMCC packets which are inputted from the data-to-be-played-back selecting unit 227 and each of which has a required program number, acquires control information indicating information about the data broadcasting file configuration, and analyzes the description of the control information. The DSMCC processing unit then notifies the analyzed control information to the packet data write control unit 228, acquires DSMCC packets with which the "startup.bml" file is transmitted out of the DSMCC packets transferred in turn from the data-to-be-played-back selecting unit 227 according to the control information, and reconstructs the "startup.bml" file.

When the reconstructed "startup.bml" file is outputted thereto from the DSMCC processing unit 208, the data broadcasting content reproducing unit 209 analyzes the description of the file for a playback of the data broadcasting files. When recognizing that the "st1.png" file is referred to in the "startup.bml" file through this analysis of the description of the file, the data broadcasting content reproducing unit 209 instructs the DSMCC processing unit 208 to acquire the "st1.png" file. The DSMCC processing unit 208 then performs a process of acquiring the "st1.png" file, as in the case of performing the process of acquiring the "startup.bml" file, and outputs the acquired file to the data broadcasting content reproducing unit 209. The data broadcasting content reproducing unit 209 reproduces the data broadcasting content including the reference to the "st1.png" file according to the "startup.bml" file, inputs the output image to the image mixer 211, and the image mixer then outputs an composite image signal which is obtained by compositing the output image with an image signal from the image/sound reproducing unit 210 to the image monitor 12 to make the image monitor display the composite image.

While the reception state is good, the packet data write control unit 228 lists all DSMCC packets of one set which constructs the program according to the control information notified from the DSMCC processing unit 208, adds information in which a status of storage of each packet in the packet data buffer 226 is recorded (information indicating whether or not each packet has been stored in the packet data buffer), and generates a construction DSMCC packet table. The packet data write control unit 228 checks the status of storage of each DSMCC packet inputted from the data-to-be-played-back selecting unit 227 in the packet data buffer 226 according to this table. When one inputted DSMCC packet has not been stored, the packet data write control unit 228 stores this packet in the packet data buffer 226 and records information indicating "stored" for this packet into this construction DSMCC packet table. In contrast, when information indicating that the inputted DSMCC packet has been stored is recorded in this construction DSMCC packet table, the packet data write control unit reads and throws away the packet. By processing each inputted DSMCC packet in this way, the packet data write control unit stores all DSMCC packets of one data broadcasting program together in the packet data buffer 226.

Next, when the reception state has gotten worse while the "startup.bml" file is displayed on the screen, the data-to-be-played-back selecting unit 227 sets a built-in switch on the basis of the determination result of the reception state determining unit 221 in such a manner that the output of the packet data read control unit 229 is provided to the DSMCC processing unit 208. Assuming that the user clicks a link button to the "1.bml" file using the remote control 15, information indicating the click of the link button is notified to the data broadcasting content reproducing unit 209 by way of the device management unit 203. As a result, the data broadcasting content reproducing unit 209 instructs the DSMCC processing unit 208 to acquire the "1.bml" file.

Because the DSMCC processing unit 208 can recognize that the reception state is getting worse from the determination by the reception state determining unit 221, the DSMCC processing unit 208 makes a request of the packet data read control unit 209 for acquisition of two DSMCC packets for reconstructing the "1.bml" file from the control information. The packet data read control unit 209 checks the status of storage of each of the packets in the packet data buffer 226 on the basis of the construction DSMCC packet table generated by the DSMCC data write control unit 208. When they have been stored in the packet data buffer, the packet data read control unit 209 reads the packets and outputs them to the DSMCC processing unit 208 by way of the data-to-be-played-back selecting unit 227. The DSMCC processing unit 208 reconstructs the "1.bml" file from the inputted DSMCC packets and outputs the file to the data broadcasting content reproducing unit 209, so that the file is played back, like the above-mentioned "startup.bml" file, and is displayed on the image monitor 12. Therefore, even when the reception state is getting worse, the user can view and listen to only the data broadcasting service.

As mentioned above, the digital broadcasting receiver in accordance with this Embodiment 3 uses DSMCC packets which are multiplexed into a real-time broadcast wave in order to acquire the newest data broadcasting content while the reception state is good, whereas while the reception state gets worse, the digital broadcasting receiver plays back the data broadcasting content on the basis of one set of DSMCC packets which constructs the data broadcasting program and which was stored beforehand while the reception state was good. Therefore, the digital broadcasting receiver enables the user to enjoy the data broadcasting content regardless of the reception state. Furthermore, even if the digital broadcasting service is a an additional service of a live outside broadcast or a service of an emergency broadcast, and is a content newly made available because of sudden program scheduling or the like, the digital broadcasting receiver can handle the content by performing the same processing as that which is performed on a data broadcasting content which is made available beforehand.

The digital broadcasting receiver can be so constructed as to, when all or part of the DSMCC packets is updated according to the control information in the DSMCC packets (for example, when event_id of PMT, data_event_id of additional_data_component_info of the data coding method descriptor, moduleVersion of DownloadInfoIndication, etc. are updated), check information about the update therein, delete old data from the packet data buffer 226 when recognizing the update, and store the newest DSMCC packets therein.

The digital broadcasting receiver can be so constructed as to, when the DSMCC packets include a packet containing event data about the data broadcasting program (e.g., an event message defined by STD-B24, or the like), store the event data in the packet data buffer 226 together with the packets of the content, and, when issuing an instruction for reading DSMCC packets at a time of playback of the data broadcasting content file while the reception state gets worse, read the two types of DSMCC packets for the file and for the event data. In this case, all of the DSMCC packets for the event data can be outputted, or only DSMCC packets associated with the file can be outputted. By doing in this way, the data broadcasting content reproducing unit 209 can provide an effect based on the event data for the playback of the data broadcasting content regardless of whether or not the reception state is good. The playback of the event data can be carried out according to conditions, such as the date of ignition specified by the event data, or whether or not the playback of the event data is ignited can be determined by the user.

Embodiment 4

In this Embodiment 4, a method of temporarily storing a reconstructed data broadcasting content in the form of a file, instead of storing transmission packets of the data broadcasting content, will be explained.

Figure 8:
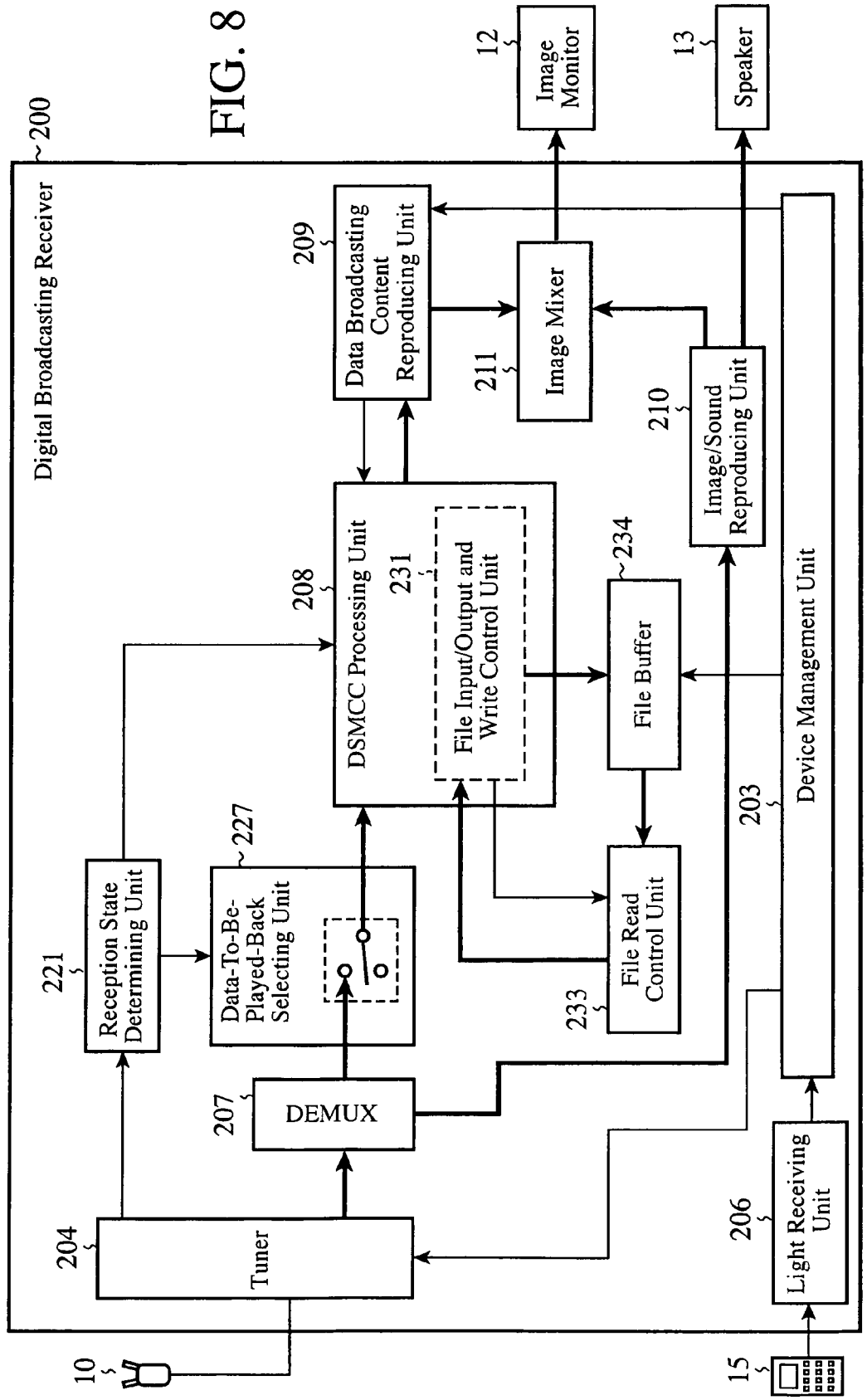
FIG. 8 is a block diagram showing the functional constitution of a digital broadcasting receiver in accordance with Embodiment 4 of the present invention.

FIG. 8 is a block diagram showing the functional constitution of a digital broadcasting receiver in accordance with Embodiment 4 of the present invention. In the figure, the same components as those shown in FIG. 7 are designated by the same reference numerals, and the explanation of the components will be omitted hereafter in principle.

A file buffer (a file storing means) 234 is a means for temporarily storing a data broadcasting content file which is reconstructed by the DSMCC processing unit 208 while the reception state of the digital broadcasting receiver is good. A file input/output and write control unit 231 is a means disposed in the DSMCC processing unit 208, for, as to data broadcasting contents files, performing input/output control of data about the data broadcasting content file reconstructed by the DSMCC processing unit 208 and what is inputted from outside the DSMCC processing unit 208, and for writing one set of data broadcasting content files which construct a data broadcasting program at a time when the reception state is good in the file buffer 234. A file read control unit 233 is a means for reading a data broadcasting content file from the data broadcasting content file buffer 234 according to a file output instruction from the file input/output and write control unit 231, and then outputting the data broadcasting content file to the file input/output and write control unit 231. While the data-to-be-played-back selecting unit 227 in accordance with above-mentioned Embodiment 3 is so constructed as to select the input of the DEMUX 207 and the input of the DSMCC data readout control unit 229, the data-to-be-played-back selecting unit 227 in accordance with this Embodiment 4 is so constructed as to input only the DSMCC packets of the data broadcasting content from the DEMUX 207 and not to output the DSMCC packets while the reception state gets worse.

Next, the operation of the digital broadcasting receiver will be explained.

While the reception state is good, the data-to-be-played-back selecting unit 227 sets a built-in switch on the basis of the determination result of the reception state determining unit 221 in such a manner that the DSMCC packets of the data broadcasting content inputted from the DEMUX 207 are inputted to the DSMCC processing unit 208. The data broadcasting content reproducing unit 209 provides notification of an instruction for acquiring the "startup.bml" file to which the program number of the data broadcast program is added to the DSMCC processing unit 208 in response to an instruction for starting a playback of the data broadcasting service from the device management unit 203, like that of Embodiment 3. The DSMCC processing unit 208 provides the notification of the instruction for acquiring the "startup.bml" file to the built-in file input/output and write control unit 231 according to the determination result (the reception state is good) of the reception state determining unit 221 at this time in such a manner that the input/output and write control unit acquires the data currently being broadcast on the highest priority. At this time, the DSMCC processing unit 208 monitors only some DSMCC packets which are inputted from the DEMUX 207 by way of the data-to-be-played-back selecting unit 227 and each of which has a requested program number, acquires control information indicating the data broadcasting file configuration information on those packets, etc., reconstructs the data broadcasting content file (the "startup.bml" file) transmitted with the DSMCC packets, and delivers the data broadcasting content file to the file input/output and write control unit 231.

When the delivered data broadcasting content file is the file which is the target for the file acquisition instruction (i.e., the "startup.bml" file in this case), the file input/output and write control unit 231 outputs the file to the data broadcasting content reproducing unit 209, and also checks to see whether or not the data broadcasting content file has been stored in the file buffer 234. When the data broadcasting content file has not been stored in the file buffer yet, the file input/output and write control unit stores this file in the file buffer 234. The data broadcasting content reproducing unit 209 analyzes the description of the inputted "startup.bml" file, and provides an instruction for acquisition of the "st1.png" file which is referred to in the "startup.bml" file, and the DSMCC processing unit 208 acquires and outputs the "st1.png" file, as in the case of the "startup.bml" file. As a result, the data broadcasting content reproducing unit 209 reproduces the data broadcasting content containing the reference to the "st1.png" file which follows the "startup.bml" file.

Next, when the reception state has gotten worse while the "startup.bml" file is displayed on the screen, the data-to-be-played-back selecting unit 227 blocks out the DSMCC packets from the DEMUX 207 on the basis of the determination result of the reception state determining unit 221, and sets the built-in switch in such a manner that no DMSCC packets are inputted to the DSMCC processing unit 208. Assuming that a user clicks a link button to the "1.bml" file using the remote control 15, information indicating the click of the link button is notified to the data broadcasting content reproducing unit 209 by way of the device management unit 203. As a result, the data broadcasting content reproducing unit makes a request of the DSMCC processing unit 208 to acquire the "1.bml" file.

Because the determination result of the reception state determining unit 221 indicates that the reception state is getting worse, the DSMCC processing unit 208 provides an instruction for acquisition of the "1.bml" file temporarily stored in the file buffer 234 to the built-in file input/output and write control unit 231. When the file which the file input/output and write control unit 231 is made of a request to acquire has been stored in the file buffer 234, the file input/output and write control unit 231 provides notification of an instruction for acquisition of the "1.bml" file to the file read control unit 233. The file read control unit 233 reads the file (in this case, the "1.bml" file) from the file buffer 234 according to this notification of the acquisition instruction, and outputs the read file to the data broadcasting content reproducing unit 209 by way of the file input/output and write control unit 231, as in the case of the "startup.bml" file. As a result, the data broadcasting content reproducing unit 209 reproduces the data broadcasting content which follows the "1.bml" file.

As mentioned above, because the digital broadcasting receiver in accordance with this Embodiment 4 holds the data broadcasting content file which has the format which was set immediately before the playback is started as the data which the digital broadcasting receiver holds temporarily while the reception state is good, the digital broadcasting receiver can perform interpolation playback of the data broadcasting content more quickly when the reception state is getting worse.

The digital broadcasting receiver can be so constructed as to, when the DSMCC packets include event data about the data broadcasting program (e.g., an event message defined by STD-B24, or the like), store the event data in the file buffer 234 together with the data broadcasting content file, and, when playing back the data broadcasting content file while the reception state gets worse, read both the data broadcasting content file and the event data by using the file input/output and write control unit 231. By doing in this way, the data broadcasting content reproducing unit 209 can provide an effect based on the event data for the playback of the data broadcasting content regardless of whether or not the reception state is good.

Embodiment 5

In each of the above-mentioned embodiments, the method of temporarily storing either image data and sound data or data for a data broadcasting content at a time when the reception state is good, and alternatively providing a display using these stored data at a time when the reception state is getting worse is shown. However, there are some receivers which cannot provide such a temporary data area. In this Embodiment 5, a method of being able to provide a display having a minimum amount of information at a time when the reception state is getting worse even in such a receiver will be explained.

Figure 9:
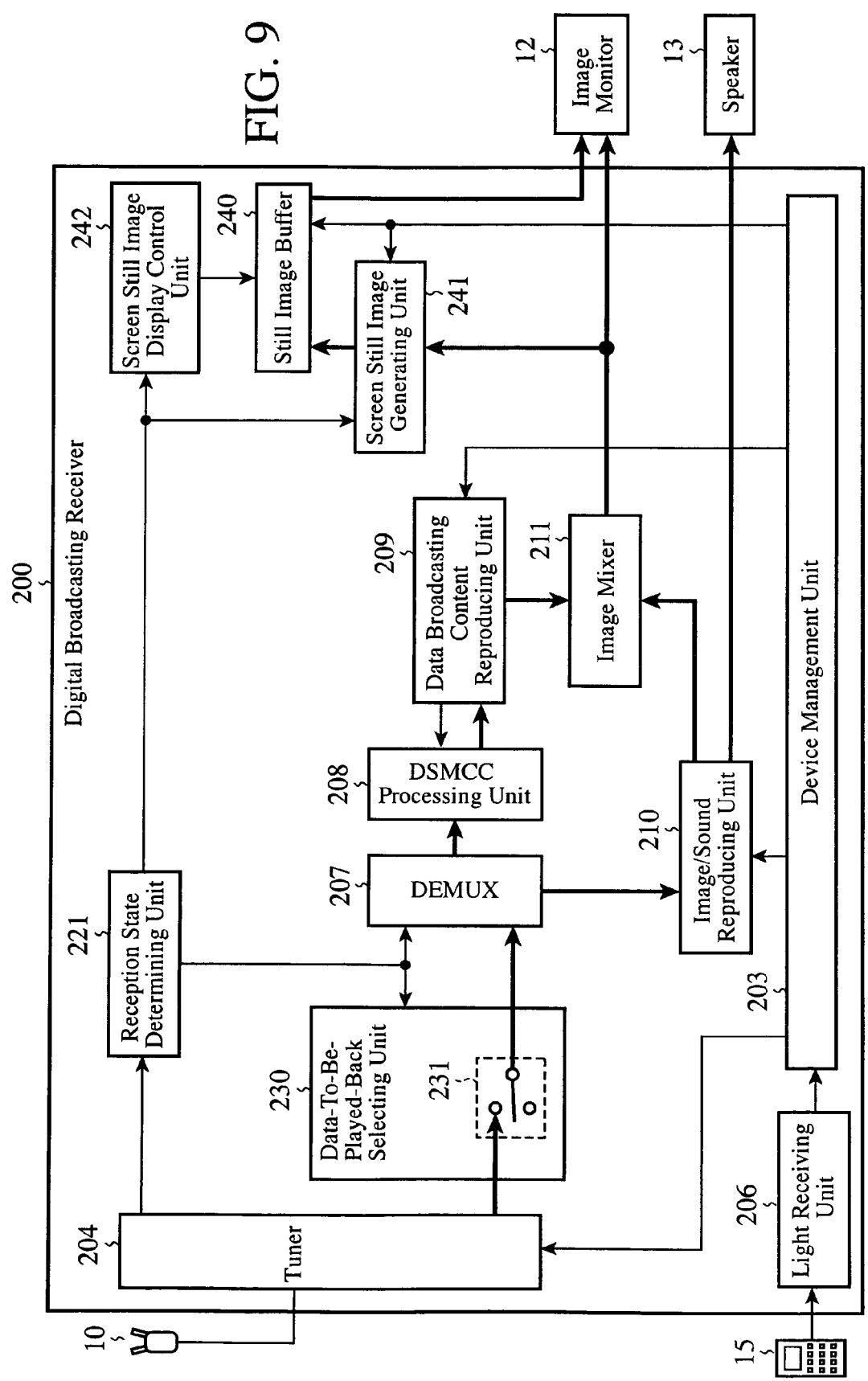
FIG. 9 is a block diagram showing the functional constitution of a digital broadcasting receiver in accordance with Embodiment 4 of the present invention.

FIG. 9 is a block diagram showing the functional constitution of a digital broadcasting receiver in accordance with Embodiment 4 of the present invention. In the figure, the same components as those shown in FIG. 2 are designated by the same reference numerals, and the explanation of the components will be omitted hereafter in principle.

A still image buffer (a still image storing means) 240 is a means for temporarily storing a fixed amount of screen still images generated from an image signal. A screen still image generating unit 241 is a means for generating a screen still image from the image signal which is composited by the image mixer 211 on the basis of the determination result of the reception state determining unit 221 at a time when the reception state is good, and for storing the screen still image in the still image buffer 240. A screen still image display control unit 242 is a means for reading screen still images stored in the still image buffer 240 in order that they were stored on the basis of the determination result of the reception state determining unit 221 at a time when the reception state is getting worse, and for outputting the screen still images to the image monitor 12. In this embodiment, switches built in the data-to-be-played-back selecting unit 230 are only the tuner input selection switch 231.

Next, the operation of the digital broadcasting receiver will be explained.

When the reception state is good, the data-to-be-played-back selecting unit 230 sets the built-in switch 235 on the basis of the determination result of the reception state determining unit 221 in such a manner that a TS inputted from the tuner 204 is inputted to the DEMUX 207. Therefore, the TS inputted from the tuner 204 is demultiplexed into image coded data, sound coded data, and DSMCC packets of a data broadcasting content by the DEMUX 207, and the image coded data and the sound coded data are inputted to the image/sound reproducing unit 210 and the DSMCC packets are inputted to the DSMCC processing unit 208. The image/sound reproducing unit 210 decodes the image coded data and the sound coded data to generate an image signal, and outputs it to the image mixer (an image compositing means) 211. On the other hand, the DSMCC processing unit 208 extracts the control information on the data broadcasting program from the DSMCC packets demultiplexed by the DEMUX 207, acquires required files on the basis of the control information, and outputs the files to the data broadcasting content reproducing unit 209. The data broadcasting content reproducing unit 209 reproduces an image signal of the data broadcasting content on the basis of the inputted files, and outputs the image signal to the image mixer 211. The image mixer 211 composites the two inputted image signals into an image signal and outputs this image signal to the image monitor 12 to make the image monitor display the image. On the other hand, a sound signal acquired by the image/sound reproducing unit 210 is outputted to the speaker 13.

When the reception state is good, the screen still image generating unit 241 generates a screen still image from the image signal composited by image mixer 211 on the basis of the determination result of the reception state determining unit 221, for example, at fixed time intervals, and temporarily stores this screen still image in the still image buffer 240.

Next, when the reception state is getting worse, the data-to-be-played-back selecting unit 230 sets the tuner input selection switch 231 on the basis of the determination result of the reception state determining unit 221 in such a manner that the TS output to the DEMUX 207 is blocked out. Therefore, while no outputs can be acquired from both the image/sound reproducing unit 210 and the data broadcasting content reproducing unit 209, the screen still image display control unit 242, in this case, reads screen still images which are temporarily stored in the still image buffer 240 from the still image buffer 240 in order that they were stored in the still image buffer, and outputs them to the image monitor 12.

In the above-mentioned case, the example in which the timing at which the screen still image display control unit generates a screen still image is at fixed time intervals is shown. In another example, the screen still image display control unit generates a screen still image at a timing at which the data broadcasting service screen is updated in response to a user's operation, event data, or the like.

As mentioned above, the digital broadcasting receiver in accordance with this Embodiment 5 generates screen still images from the program data while the reception state is good and temporarily stores them, and displays the screen still images stored therein when the reception state is getting worse. Therefore, the present embodiment can be applied to a digital receiver which cannot temporarily store a large amount of data, such as a broadcasting stream or image coded data and sound coded data.

In the above-mentioned example, the digital broadcasting receiver generates screen still images from a composite image which is a composite of the image signal of a TV program and the image signal of a data broadcasting service. As an alternative, the digital broadcasting receiver can generate and use screen still images including only images of a TV program or only images of a data broadcasting service.

In each of the above-mentioned embodiments, the TS buffer 220, the DSMCC buffer 226, the data broadcasting content file buffer 234, or the still image buffer 240 is shown as the buffer for temporarily storing data. As each of these buffers, any storage means, such as a memory, an HDD, or an external storage, can be used as long as it can temporarily store data in an area thereof. In a case in which an HDD or an external storage is used as each of those buffers, the digital broadcasting receiver can be so constructed as to perform a process of erasing the memory content which is based on the viewing and listening constraints of programs at a time when, for example, a user ends the viewing and listening-to of a program or switches off the digital broadcasting receiver. Furthermore, the digital broadcasting receiver can provide a means for, when playing back alternative data from a temporary storage buffer, displaying information indicating that the playback is the one of alternative data on the image monitor so as to notify the user whether the current playback is either playback of a real-time broadcast wave of a program or playback of alternative data.

INDUSTRIAL APPLICABILITY

As mentioned above, because the digital broadcasting receiver in accordance with the present invention stores program data currently being received while its reception state is good, and, when the reception state has gotten worse, plays back and displays, as alternative data, the program data which have been stored immediately before the reception state has gotten worse, instead of the received data, a source for the alternative data can be disposed in the receiver itself and therefore application of the present invention to vehicle-mounted digital broadcasting receivers which will become widespread from now on can be expected.

The invention claimed is:

1. A digital broadcasting receiver comprising:
a tuner for tuning in to a specified channel from a broadcasting wave received so as to extract a transport stream, and for generating reception state information indicating a reception state depending on a radio field intensity of the broadcasting wave;
a reception state determining means for determining the reception state on a basis of said reception state information;
a transport stream storing means for temporarily storing a fixed amount of transport stream;
a data-to-be-played-back selecting means for, when said reception state determining means determines that the reception state is good, outputting the transport stream extracted by said tuner to a backward stage, just as it is, to set the transport stream as data to be played back, and storing the transport stream in said transport stream storing means, and for, when said reception state determining means determines that the reception state has gotten worse, blocking out an output of said tuner, and reading transport streams stored from said transport stream storing means in order that they were stored and outputting them to a backward stage as data to be played back; and
a demultiplexer for demultiplexing a transport stream outputted from said data-to-be-played-back selecting means into packet data about multiple media, delivering these data to a corresponding playback means provided for each of the multiple media, and, when the reception state determined by said reception state determining means changes, handling the change as a discontinuous point of the transport stream.

2. The digital broadcasting receiver according to claim 1, characterized in that when notified, from program scheduling information included in a broadcasting wave, such as program arrangement information about programs to be broadcast, that broadcasting of a broadcast program currently being viewed and listened-to has been ended, the transport stream storing means newly stores data about a next broadcast program after discarding all data stored.

3. The digital broadcasting receiver according to claim 1, characterized in that even when notified, from program scheduling information included in a broadcasting wave which was received while the reception state was good, such as program arrangement information about programs to be broadcast, that a broadcast program currently being viewed and listened-to has been ended, the demultiplexer continues playing back program data which have been stored in the transport stream storing means immediately before said broadcast program has been ended if the digital broadcasting receiver cannot play back new program data currently being broadcast because the reception state is getting worse.

4. The digital broadcasting receiver according to claim 1, characterized in that when a program viewing and listening-to expiration date of program data stored in the transport stream storing means has come, the demultiplexer stops playback of the stored data.

5. The digital broadcasting receiver according to claim 1, characterized in that said digital broadcasting receiver comprises: an indispensable data selection means for deleting packets other than significant packets from a transport stream which is provided thereto from the tuner via the data-to-be-played-back selecting means while the reception state is good, inserting playback timing information for providing a timing required at a time of playback of the transport stream into the transport stream instead of the deleted packets, and storing the transport stream in the transport stream storing means; and a data reading control means for, while the reception state gets worse, reading the stream stored in said transport stream storing means and comprised of the significant packets and said timing information, inserting a number of packets which provide a playback timing on a basis of said timing information so as to generate a transport stream having an original length, and outputting the transport stream to the demultiplexer via said data-to-be-played-back selecting means.

6. The digital broadcasting receiver according to claim 5, characterized in that the indispensable data selection means deletes packets other than significant packets of a program currently being viewed and listened-to from significant packets of a plurality of programs multiplexed into the transport stream from the tuner.

7. The digital broadcasting receiver according to claim 5, characterized in that the indispensable data selection means deletes packets other than packets of a specific medium and packets of information about control of the specific medium from significant packets of a plurality of programs multiplexed into the transport stream from the tuner.

8. The digital broadcasting receiver according to claim 5, characterized in that the reception state information is not the radio field intensity of the broadcasting wave which is acquired from the tuner, but is sequential number information or time information which is included in a packet header or a like of the transport stream in a multiplexer.

9. The digital broadcasting receiver according to claim 1, characterized in that the reception state information is not the radio field intensity of the broadcasting wave which is acquired from the tuner, but is sequential number information or time information which is included in a packet header or a like of the transport stream in a multiplexer.

10. A digital broadcasting receiver comprising:

a tuner for tuning in to a specified channel from a broadcasting wave received so as to extract a transport stream, and for generating reception state information indicating a reception state depending on a radio field intensity of the broadcasting wave;

a reception state determining means for determining the reception state on a basis of said reception state information; a demultiplexer for demultiplexing multiplexed packet data about multiple media of the extracted transport stream from said tuner into packet data of different types;

a packet data storing means for temporarily storing a fixed amount of packet data of data broadcasting;

a data broadcasting content transmission packet processing means for reconstructing required file data from packet data of an inputted data broadcasting content, and for issuing a read instruction for reading packet data stored in said packet-data storing means while the reception state is getting worse;

a data broadcasting content playback means for playing back an image signal from the file data of the data broadcasting content reconstructed by said data broadcasting content transmission packet processing means according to a data broadcasting playback instruction from a user;

a packet data write control unit for extracting only packets which construct a data-broadcasting program from data-broadcasting packet data inputted thereto according to a file acquisition instruction from said data broadcasting content playback means, and for storing a set of packets in said packet data storing means;

a packet data read control unit for reading packet data from said packet data storing means according to the packet read instruction from the data broadcasting content transmission packet processing means; and a data-to-be-played-back selecting means for, when said reception state determining means determines that the reception state is good, outputting, as data to be played back, packet data about a data broadcasting content demultiplexed by said demultiplexer, to the data broadcasting content transmission packet processing means, and for, when said reception state determining means determines that the reception state has gotten worse, outputting the packet data which the packet-data readout control means has read from said packet data storing means to both said data broadcasting content transmission packet processing means and said packet data write control means.

11. The digital broadcasting receiver according to claim 10, characterized in that when reading required packets from the packet data storing means according to the packet read instruction from the data broadcasting content transmission packet processing means, the packet data read control means also reads event data for the data broadcasting content which are to be transmitted as one packet of data broadcasting together, and the data broadcasting content transmission packet processing means delivers said read event data to the data broadcasting content playback means in a same manner that it delivers the event data when the reception state is good and the data broadcasting contents playback means plays back the data broadcasting content in such a way as to provide an effect based on said event data.

12. The digital broadcasting receiver according to claim 10, characterized in that the reception state information is not the radio field intensity of the broadcasting wave which is acquired from the tuner, but is sequential number information or time information which is included in a packet header or a like of the transport stream in a multiplexer.

13. A digital broadcasting receiver comprising:

a tuner for tuning in to a specified channel from a broadcasting wave received so as to extract a transport stream, and for generating reception state information indicating a reception state depending on a radio field intensity of the broadcasting wave;

a reception state determining means for determining the reception state on a basis of said reception state information; a demultiplexer for demultiplexing multiplexed packet data about multiple media of the extracted transport stream from said tuner into packet data of different types;

a data-to-be-played-back selecting means for, when said reception state determining means determines that the reception state is good, outputting, as data to be played back, packet data about a data broadcasting content demultiplexed by said demultiplexer to the data broadcasting content transmission packet processing means, and for, when said reception state determining means determines that the reception state has gotten worse, blocking out an input from said demultiplexer to the data broadcasting content transmission packet processing means;

a data broadcasting content transmission packet processing means for reconstructing file data about the data broadcasting content from the packet data about the data broadcasting content which are inputted thereto via said data-to-be-played-back selecting means;

a data broadcasting contents playback means for playing back an image signal from the file data about the data broadcasting content outputted from said data broadcasting content transmission packet processing means according to a data-broadcasting playback instruction from a user;

a file storing means for temporarily storing a data broadcasting content file inputted thereto;

a file input/output and write control means disposed in said data broadcasting content transmission packet processing means, for outputting the reconstructed file data about the data broadcasting content to said data broadcasting content playback means, and for storing a set of data broadcasting content files which construct a data-broadcasting program in said file storing means; and a file read control unit for, when said reception state determining means determines that the reception state has gotten, reading the set of data broadcasting content files stored in said file storing means according to a file read instruction from said data broadcasting content transmission packet processing means, and for outputting the set of data broadcasting content files to said data broadcasting content playback means via said file input/output and write control means.

14. The digital broadcasting receiver according to claim 13, characterized in that the file input/output and write control means stores event data for a data broadcasting content currently being played back which are transmitted as one packet of data broadcasting together in the file storing means when the reception state is good, the file read control means reads the event data together when reading the file data about the data broadcasting content stored in said file storing means according to a file read instruction from the data broadcasting content transmission packet processing means, and delivers the event data to the data broadcasting content playback means in a same way that it does when the reception state is good, and said data broadcasting content playback means plays back the data broadcasting content in such a way as to provide an effect based on the event data delivered thereto.

15. The digital broadcasting receiver according to claim 13, characterized in that the reception state information is not the radio field intensity of the broadcasting wave which is acquired from the tuner, but is sequential number information or time information which is included in a packet header or a like of the transport stream in a multiplexer.

16. A digital broadcasting receiver comprising:
a tuner for tuning in to a specified channel from a broadcasting wave received so as to extract a transport stream, and for generating reception state information indicating a reception state depending on a radio field intensity of the broadcasting wave;
a reception state determining means for determining the reception state on a basis of said reception state information; a data-to-be-played-back selecting means for, when said reception state determining means determines that the reception state is good, outputting the transport stream extracted by said tuner to a backward stage, just as it is, and for, when said reception state determining means determines that the reception state has gotten worse, blocking out an output of said tuner;
a demultiplexer for demultiplexing the transport stream outputted from said data-to-be-played-back selecting means into packet data about multiple media;
a plurality of reproducing means for reproducing signals of media including an image and a sound of a TV program, and a data broadcasting content from the packet data about the multiple media demultiplexed by said demultiplexer, respectively;
an image compositing means for compositing an image signal of the TV program and an image signal of the data broadcasting content which are acquired from said plurality of reproducing means to output a composite image signal to an image monitor;
a still image storing means for temporarily storing a fixed amount of screen still images;
a screen still image generating means for, when said reception state determining means determines that the reception state is good, generating a screen still image from the composite image signal generated by said image compositing means, and storing the screen still image in said still image storing means; and
a screen still image display control means for, when said reception state determining means determines that the reception state has gotten worse, reading screen still images stored in said still image storing means in order that they were stored, and displaying them on said picture monitor.

17. The digital broadcasting receiver according to claim 16, characterized in that the screen still image generating means, instead of generating the screen still image from the composite image signal associated with the TV program and the data broadcasting content, generates a screen still image only from the image signal of the TV program.

18. The digital broadcasting receiver according to claim 16, characterized in that the screen still image generating means, instead of generating the screen still image from the composite image signal associated with the TV program and the data broadcasting content, generates a screen still image only from the image signal of the data broadcasting content.

19. The digital broadcasting receiver according to claim 16, characterized in that the reception state information is not the radio field intensity of the broadcasting wave which is acquired from the tuner, but is sequential number information or time information which is included in a packet header or a like of the transport stream in a multiplexer.

* * * * *